US007023333B2

(12) United States Patent
Blanco et al.

(10) Patent No.: US 7,023,333 B2
(45) Date of Patent: Apr. 4, 2006

(54) AUTOMATIC ACTIVATION OF AN IN-CAR VIDEO RECORDER USING A VEHICLE SPEED SENSOR SIGNAL

(75) Inventors: Louis W. Blanco, Boonton, NJ (US); Leo Lorenzetti, Hardyston, NJ (US)

(73) Assignee: L-3 Communications Mobile Vision, Inc., Boonton, NJ (US)

(*) Notice: Subject to any disclaimer, the term of this patent is extended or adjusted under 35 U.S.C. 154(b) by 52 days.

(21) Appl. No.: 10/691,484

(22) Filed: Oct. 22, 2003

(65) Prior Publication Data

US 2005/0088291 A1 Apr. 28, 2005

(51) Int. Cl.
*B60Q 1/00* (2006.01)

(52) U.S. Cl. ......................... 340/441; 701/29; 348/148

(58) Field of Classification Search ................ 340/441, 340/425.5, 438, 439; 348/148, 149, 135; 701/29

See application file for complete search history.

(56) References Cited

U.S. PATENT DOCUMENTS

| | | | | |
|---|---|---|---|---|
| 4,789,904 A | 12/1988 | Peterson | 358/310 |
| 4,873,711 A | 10/1989 | Roberts et al. | 379/58 |
| 4,949,186 A | 8/1990 | Peterson | 358/355 |
| 5,012,335 A | 4/1991 | Cohodar | 358/108 |
| 5,111,289 A | 5/1992 | Lucas | 358/108 |
| 5,491,464 A | 2/1996 | Carter et al. | 340/425.5 |
| 5,515,042 A * | 5/1996 | Nelson | 340/937 |
| 5,568,510 A | 10/1996 | Tam | 375/202 |
| 5,617,086 A * | 4/1997 | Klashinsky et al. | 340/907 |
| 5,677,979 A | 10/1997 | Squicciarini et al. | 386/46 |
| 5,764,685 A | 6/1998 | Tanaka et al. | 375/200 |
| 5,794,125 A | 8/1998 | Grad | 455/38.3 |
| 5,794,164 A | 8/1998 | Beckert et al. | 701/1 |
| 5,812,056 A | 9/1998 | Law | 340/539 |
| 5,938,717 A * | 8/1999 | Dunne et al. | 701/117 |
| 6,002,326 A | 12/1999 | Turner | 340/426 |
| 6,037,977 A | 3/2000 | Peterson | 348/148 |
| 6,181,373 B1 | 1/2001 | Coles | 348/158 |
| 6,211,907 B1 | 4/2001 | Scaman et al. | 348/148 |
| 6,262,764 B1 * | 7/2001 | Perterson | 348/148 |
| 6,275,773 B1 | 8/2001 | Lemelson et al. | 701/301 |
| 6,346,890 B1 | 2/2002 | Bellin et al. | 340/825.52 |
| 6,389,340 B1 | 5/2002 | Rayner | 701/35 |

(Continued)

FOREIGN PATENT DOCUMENTS

JP 05183788 A 7/1993

*Primary Examiner*—John Tweel, Jr.
(74) *Attorney, Agent, or Firm*—Mayer & Williams PC; Mark K. Young, Esq.; Karin L. Williams, Esq.

(57) ABSTRACT

An in-car video system and method are provided where a vehicle speed derived from a vehicle speed sensor ("VSS") signal is compared against a user-settable threshold value. If the vehicle speed exceeds the threshold value, an alarm is generated. The alarm is used by the in-car video system to automatically activate the record function of a video recorder. The alarm may be optionally sent to a remote location, such as a police agency's headquarters as an alert that the vehicle speed has exceeded a set threshold and that a possible high speed pursuit has commenced. Vehicle speed information derived from the VSS signal is generated into a form that is continuously displayable on an in-car video monitor or continuously recordable by the video recorder along with the video and audio information captured by the in-car video system camera and microphones.

20 Claims, 3 Drawing Sheets

U.S. PATENT DOCUMENTS

| | | | | |
|---|---|---|---|---|
| 6,469,735 | B1 | 10/2002 | Coles | 348/158 |
| 6,487,500 | B1 | 11/2002 | Lemelson et al. | 701/301 |
| 6,518,881 | B1 | 2/2003 | Monroe | 340/539 |
| 6,542,076 | B1 | 4/2003 | Joao | 340/539 |
| 6,542,077 | B1 | 4/2003 | Joao | 340/539 |
| 6,574,314 | B1 | 6/2003 | Martino | 379/93.17 |
| 6,587,046 | B1 | 7/2003 | Joao | 340/539.14 |
| 6,587,152 | B1 | 7/2003 | Sharp et al. | 348/373 |
| 6,675,006 | B1 | 1/2004 | Diaz et al. | 455/404.1 |
| 6,681,195 | B1 * | 1/2004 | Poland et al. | 702/142 |
| 6,683,526 | B1 | 1/2004 | Bellin et al. | 340/3.43 |
| 6,690,294 | B1 * | 2/2004 | Zierden | 340/937 |
| 6,696,978 | B1 * | 2/2004 | Trajkovic et al. | 340/936 |
| 2001/0001561 | A1 | 5/2001 | Coles | 348/158 |
| 2001/0010490 | A1 | 8/2001 | Bellin | 340/7.46 |
| 2001/0034768 | A1 | 10/2001 | Bain et al. | 709/206 |
| 2002/0003571 | A1 | 1/2002 | Schofield et al. | 348/148 |
| 2002/0036565 | A1 | 3/2002 | Monroe | 340/425.5 |
| 2002/0041240 | A1 | 4/2002 | Ikeda et al. | 340/993 |
| 2002/0095601 | A1 | 7/2002 | Hind | 713/201 |
| 2002/0101509 | A1 | 8/2002 | Slomski | 082/348 |
| 2002/0121969 | A1 | 9/2002 | Joao | 340/425.5 |
| 2002/0131768 | A1 | 9/2002 | Gammenthaler | 386/107 |
| 2003/0008662 | A1 | 1/2003 | Stern et al. | 455/456 |
| 2003/0016130 | A1 | 1/2003 | Joao | 340/539 |
| 2003/0016834 | A1 | 1/2003 | Blanco et al. | 381/91 |
| 2003/0036825 | A1 | 2/2003 | Kim | 701/1 |
| 2003/0052970 | A1 | 3/2003 | Dodds et al. | 348/148 |
| 2003/0067541 | A1 | 4/2003 | Joao | 348/148 |
| 2003/0067542 | A1 | 4/2003 | Monroe | 348/148 |
| 2003/0071899 | A1 | 4/2003 | Joao | 348/148 |
| 2003/0080713 | A1 | 5/2003 | Kirmuss | 320/150 |
| 2003/0080878 | A1 | 5/2003 | Kirmuss | 340/936 |
| 2003/0081121 | A1 | 5/2003 | Kirmuss | 348/143 |
| 2003/0081122 | A1 | 5/2003 | Kirmuss | 348/148 |
| 2003/0081123 | A1 | 5/2003 | Rupe | 348/148 |
| 2003/0081127 | A1 | 5/2003 | Kirmuss | 348/207.99 |
| 2003/0081128 | A1 | 5/2003 | Kirmuss | 348/207.99 |
| 2003/0081934 | A1 | 5/2003 | Kirmuss | 386/46 |
| 2003/0081935 | A1 | 5/2003 | Kirmuss | 386/46 |
| 2003/0086000 | A1 | 5/2003 | Siemens et al. | 348/148 |
| 2003/0087636 | A1 | 5/2003 | Mazzara et al. | 455/426 |
| 2003/0095688 | A1 | 5/2003 | Kirmuss | 382/105 |
| 2003/0112929 | A1 | 6/2003 | Chuang | 379/88.13 |
| 2003/0151663 | A1 | 8/2003 | Lorenzetti et al. | 348/148 |
| 2003/0159044 | A1 | 8/2003 | Doyle et al. | 713/176 |
| 2003/0185296 | A1 | 10/2003 | Masten, Jr. | 375/240.01 |
| 2003/0193404 | A1 | 10/2003 | Joao | 340/825.71 |
| 2003/0206102 | A1 | 11/2003 | Joao | 340/539.1 |
| 2003/0210328 | A1 | 11/2003 | Mazzilli | 348/148 |
| 2003/0218551 | A1 | 11/2003 | Crocker et al. | 340/905 |
| 2004/0008255 | A1 | 1/2004 | Lewellen | 348/148 |
| 2004/0013192 | A1 | 1/2004 | Kennedy | 375/240 |
| 2004/0036601 | A1 | 2/2004 | Obradovich | 340/540 |
| 2004/0070515 | A1 | 4/2004 | Burkley et al. | 340/825.49 |
| 2004/0075547 | A1 | 4/2004 | Vojtech et al. | 340/500 |
| 2004/0145457 | A1 | 7/2004 | Schofield et al. | 340/425.5 |
| 2004/0146272 | A1 | 7/2004 | Kessel et al. | 386/46 |
| 2004/0150717 | A1 | 8/2004 | Page et al. | 348/148 |
| 2004/0155781 | A1 | 8/2004 | DeOme | 340/573.1 |
| 2004/0160319 | A1 | 8/2004 | Joao | 340/539.1 |
| 2004/0177253 | A1 | 9/2004 | Wu et al. | 713/176 |
| 2004/0189803 | A1 | 9/2004 | Price | 348/151 |
| 2004/0201765 | A1 | 10/2004 | Gammenthaler | 348/333.01 |

* cited by examiner

AUTOMATIC ACTIVATION OF AN IN-CAR VIDEO RECORDER USING A VEHICLE SPEED SENSOR SIGNAL

BACKGROUND OF THE INVENTION

This invention is related generally to surveillance systems, and more particularly to the automatic activation of an in-car video recorder using a signal from a vehicle speed sensor.

Vehicle-mounted surveillance systems, also termed in-car video systems, are seeing increased use in the security industry and law enforcement community as an effective means to provide an indisputable video and audio record of encounters involving officers and citizens. In these systems, a video camera is typically mounted on the police car's dashboard or windshield and is generally arranged to have a field of view of the area to the immediate front of the car. The field of view approximately corresponds to what an officer would see when seated in the car's front seat.

The video camera is operably coupled to a video recorder, such as a video cassette recorder ("VCR") or digital video recorder ("DVR"), mounted in the police car, often in the trunk. A video recording may be started manually by the officer, or in some systems, the video recording is started automatically when, for example, the officer activates the police car's emergency systems (such as overhead lights and/or sirens), or when a vehicle speed-measuring radar unit is operated. Some in-car video systems have auxiliary trigger inputs that automatically activate the record mode of the video recorder when a trigger signal is received. For example, some departments connect the shotgun release to the auxiliary trigger input in order to automatically begin video recording when a police officer removes the shotgun from its vehicle mount.

In-car video systems serve to enhance prosecution of traffic, DWI/DUI and controlled dangerous substances offenses (to name just a few) by contributing detailed graphical and auditory evidence in a time-sequential manner that is inherently unbiased and objective. Such evidence is a valuable adjunct to eyewitness and officer testimony. In addition, as with other quality-improvement initiatives where conduct is surveyed and recorded, in-car video system usage has been shown to assist in the maintenance of high professional standards among law enforcement personnel. Police-community relations have improved and citizen complaints of police misconduct have lessened in many jurisdictions where in-car video systems are used, often as a result of the inherently high-quality evidence provided by such systems. Videos taken with in-car video systems are also valuable training aids to law enforcement personnel.

Video evidence is protected (and the evidentiary chain of custody readily established) because the video recorder and video recording medium (i.e., videotape or hard disk drive) are typically "locked", often both mechanically and electronically, within a tamperproof security enclosure in the car that is only accessible by law enforcement command personnel. In addition, the in-car systems are configured to prevent erasure or over-recording of a recorded encounter to ensure the integrity of the video evidence. In-car video systems may superimpose time and date stamps on the recorded video image as a further enhancement to the evidentiary strength of the videotape.

In-car video systems generally employ a wireless microphone carried on the person of a law enforcement officer to record an audio soundtrack that accompanies the visual scene captured on videotape. The audio soundtrack is an extremely valuable complement to the recorded video because it acts as a transcript of what was said, by whom and when. In some cases, the audio soundtrack is more valuable as evidence than the visual record because issues pertaining to consent, admissions, and state-of-mind of the suspect and/or officer (to cite just a few examples) may be resolved more effectively by the audio record. In some systems, additional wired microphones may be deployed in other locations within the car, such as the rear-seat passenger area, to record sounds and conversations emanating from those locations.

While current in-car video systems perform very well in many applications, other ways to automatically trigger a video recording would be desirable. When in-car systems are automatically triggered upon the occurrence of defined events, the need for user intervention (particularly during periods of high stress) is lessened and thus fewer incidents of interest are missed being video recorded.

SUMMARY OF THE INVENTION

An in-car video system and method are provided where a vehicle speed derived from a vehicle speed sensor ("VSS") signal is compared against an activation threshold. If the vehicle speed exceeds the activation threshold, an alarm is generated. The alarm is used to automatically activate the record function of a video recorder. The alarm may be optionally sent to a remote location, such as a police agency's headquarters, as an alert that the vehicle speed has exceeded a set threshold and that a possible high speed pursuit has commenced. Vehicle speed information derived from the VSS signal is generated into a form that is continuously displayable on an in-car video monitor or continuously recordable by the video recorder in real time along with the video and audio information captured by the in-car video system camera and microphones.

In an illustrative embodiment of the invention, a user may select the threshold speed value, that when exceeded by the vehicle, is used to automatically activate the video recorder into record mode. Using an interface, the user may adjust the activation threshold in conventional units of speed (i.e., miles or kilometers per hour) so that the minimum vehicle speed at which the video recorder is automatically activated can be set to meet a particular need. For example, users in some urban agencies may select an automatic recording threshold of 60 miles per hour. Other agencies, for example those in more rural areas where higher routine vehicle speeds are more common, may elect to set the threshold higher at say, 100 miles per hour.

Advantageously, the invention provides a beneficial way to automatically trigger an in-car video system into a record mode of operation without requiring a user (such as a police officer) to manually activate the video recording as an incident begins to unfold. In addition, the vehicle speed information generated in accordance with the invention, and recorded along with the audio and video, is a valuable supplement to the evidentiary record provided by the video recording.

DETAILED DESCRIPTION

Figure 1:
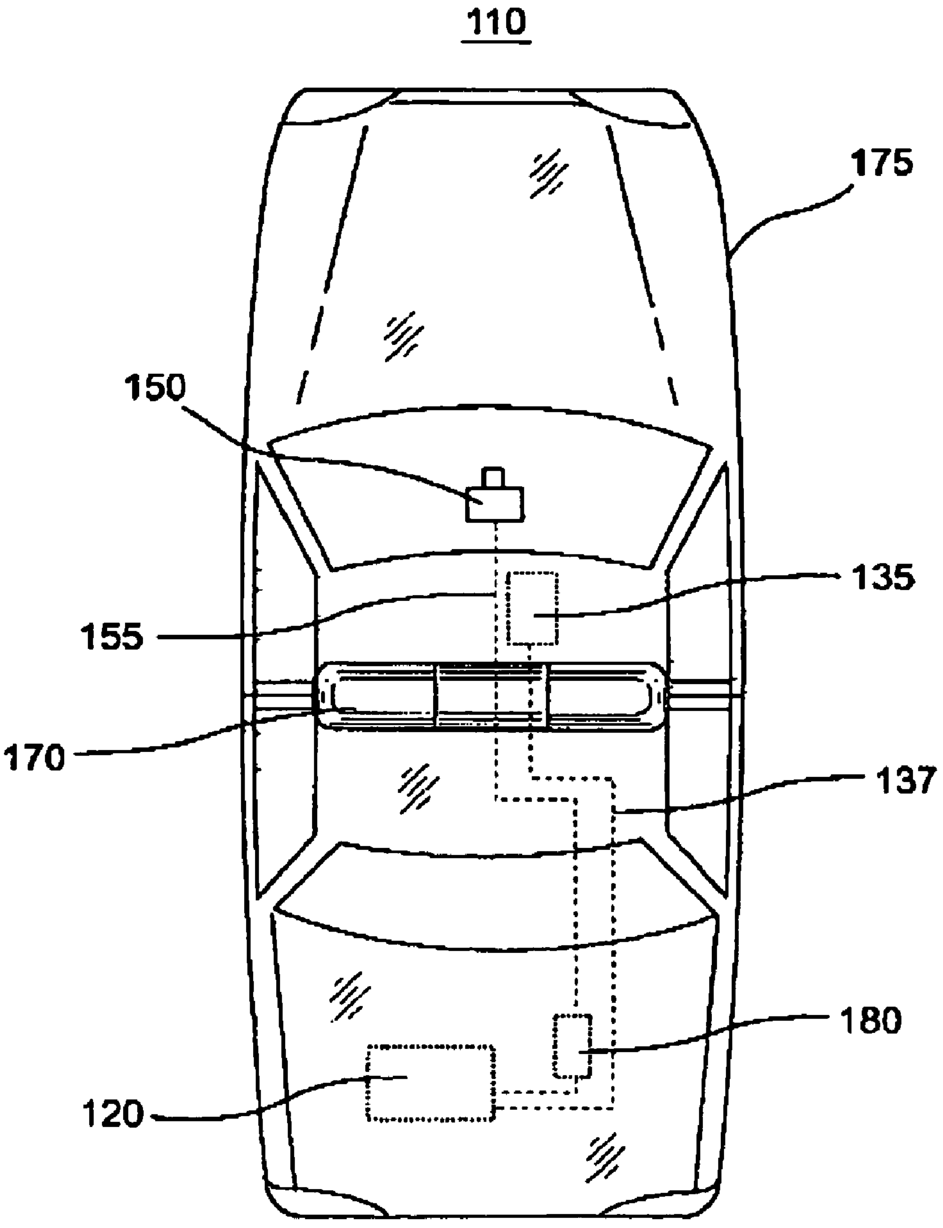
FIG. 1 is a simplified functional block diagram of an illustrative arrangement of the present invention depicting an in-car video system (including a windshield mounted camera and trunk-mounted video recorder), and an activation controller arranged in accordance with the invention.

Referring to FIG. 1, there is depicted a simplified functional block diagram of an illustrative arrangement of the present invention depicting an in-car video system 110 (including a windshield mounted camera 150 and a trunk-mounted video recorder 120). Vehicle 175 is depicted in FIG. 1 as a police cruiser with emergency lightbar 170, however it is emphasized that the features and benefits of the present invention may be equally applicable to a wide variety of vehicle types, and further that the invention is not limited to law enforcement applications. Applications of the invention to the security and the transportation industries may be readily made, for example.

Video recorder 120, as shown in FIG. 1, is typically located in secure enclosure (i.e., a "vault") contained in the trunk of the car. The enclosure is generally quite rugged, both to provide deterrents against tampering or improper access to the video recording medium (such as videotape or a hard disk drive), and also to protect the medium in the event that the vehicle 175 is involved in a crash. The enclosure may also be environmentally controlled to keep the video recorder 120 and recording medium within acceptable operating conditions. It is noted that video recorder 120 is merely representative of any of a number of recording devices that are arranged to record video and audio, either as a single device or a combination of devices. Such recording devices include those that record on tape as well as those that use other media, such as magnetic media (including disk-drives and cartridge drives), electronic media (including volatile and non-volatile memory such as flash memory), and optical media (including optically writeable disks including compact disc ("CD") and digital versatile disc ("DVD)")).

A remote control head 135 is located in vehicle 175 near the driver and is operably coupled to video recorder 120 via bus 137 to allow the video recorder 120 to be conveniently controlled by the officer from within the vehicle. Remote control head 135 may be arranged with typical controls such as "POWER", "RECORD", "STOP", "BACK", "PLAY", and "FORWARD" buttons which operate the video recorder 120 accordingly.

Camera 150 may be selected from the wide variety of available cameras. Preferably, camera 150 is a compact camera (to reduce the likelihood of obstructing the officer's view out the windshield) with color capabilities such as a solid-state CCD ("charge-coupled device") camera that can operate in low-light environments. Camera 150 may be optionally configured with digital and/or optical zoom capabilities. Camera 150, in this illustrative arrangement, is mounted to the windshield of vehicle 175, however other mounting locations may be used in other applications. Camera 150 is operably coupled to video recorder 120 via bus 155.

An activation controller 180 is operably coupled to the camera 150 and video recorder 120 and is further disposed along the bus 155. As shown in FIG. 1, the activation controller 180 is located in the trunk area of vehicle 175. However, it is emphasized that the location of the activation controller 180 depicted in FIG. 1 is merely illustrative. It is contemplated that the activation controller 180 may be conveniently situated in any of a variety of locations within the vehicle. Alternatively, the activation controller 180 may be incorporated with or within other components forming the in-car video system 110. For example, the activation controller 180 may be integrated within the video recorder 120, placed within the secure enclosure that typically houses the video recorder 120, or integrated within other components of the in-car video system 110 including the camera 150, control head 135 or video monitor (not shown in FIG. 1).

Figure 2:
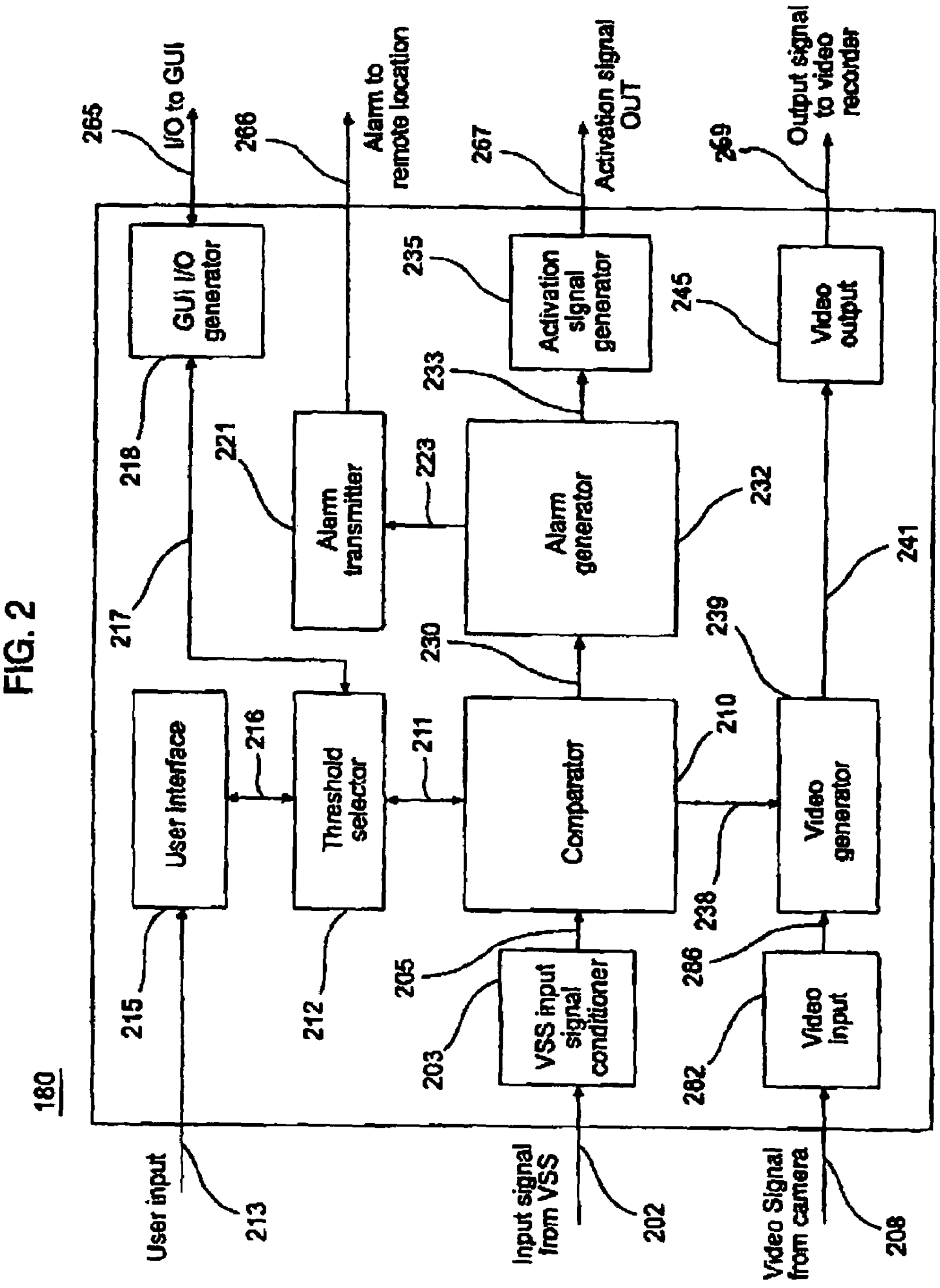
FIG. 2 is a simplified block diagram showing details of the activation controller shown in FIG. 1.

FIG. 2 is a simplified block diagram showing details of the activation controller 180 shown in FIG. 1. A VSS signal is received on line 202. Vehicle speed sensors are commonly utilized in many modern cars and are often used to indicate road wheel and/or vehicle speed to on-board systems such as anti-lock braking systems ("ABS"). The VSS sensor is typically implemented using conventional magneto-resistive or "Hall Effect" sensors, inductive sensors, magnetic pick up and exciter ring combinations or optical technologies. Typically, the VSS signal is an analog AC waveform where the frequency varies in proportion to vehicle speed (while the voltage of the VSS signal also varies with speed, it is not generally used to derive vehicle speed). The proportionality between frequency and speed is generally vehicle-dependent. For example, in the Ford Crown Victoria, a vehicle commonly used in law enforcement applications, the VSS signal frequency varies by 2.2 Hz for every mile per hour in speed. Thus, a VSS signal frequency of 132 Hz equates to a vehicle speed of 60 miles per hour. In vehicles produced by General Motors, the VSS sensor produces a frequency change of 1.1 Hz for every mile per hour of speed change. In Chrysler vehicles produced from the 2003 model year and later, a VSS frequency of 10.44 Hz per mile per hour is used. Of course these VSS signal frequencies are merely illustrative and other VSS frequencies may be readily utilized with appropriate modifications to the activation controller 180 as will be readily apparent to those skilled in the art.

The VSS signal is input on line 202 to a VSS input signal conditioner 203. This device functions as a buffer module to condition the VSS input signal into a simple TTL (i.e., logic level signal with high and low voltage states) with a nominal amplitude of 0–5 VDC that can be fed into a microprocessor. In some applications of the invention, it may be possible to eliminate the VSS input signal conditioner if the VSS sensor includes an integrated buffering circuit Alternatively, some microprocessor and integrated circuits (and in particular, application specific integrated circuits typically used in the automotive industry) are able to convert the raw AC VSS signal to an appropriate signal form internally which thus obviates the need for an external buffer.

The TTL signal output from the VSS input signal conditioner 203 on line 205 is input to comparator 210. Comparator 210 may be implemented using conventional integrated circuit and digital signal processing technologies. However, it is noted that all the functional elements shown in FIG. 2 may be readily implemented using either discrete or integrated circuits (or a combination of the two) and the precise embodiment and arrangement of the functional elements will depend on the requirements of the invention. Thus, some or all of the functions shown by individual functional blocks in FIG. 2 may be implemented in software or firmware running on an appropriately configured processor.

Comparator 210 uses the received TTL signal from the VSS input signal conditioner 203 to derive a speed that corresponds to the actual vehicle speed. Comparator 210 compares the derived vehicle speed to a stored threshold speed value. In the event that the vehicle speed exceeds the threshold value, a signal is output on line 230 to an alarm generator 232.

The alarm generator 232 receives a signal on line 230 when the comparator 230 determines that the vehicle's speed has exceeded the threshold. Upon receipt of the signal on line 230, alarm generator 232 outputs a signal on line 233 to an activation signal generator 235. Activation signal generator 235 is used to provide an activation signal of an appropriate form for input to an auxiliary input trigger on the video recorder 120 (FIG. 1) to thereby activate the video recorder into record mode. The activation signal specifications will vary according to the specific video recorder used. Alternatively, in implementations where an auxiliary input trigger is not used, an appropriate signal (e.g., a logic level signal or software command) may be sent to an in-car video system or video recorder controller to activate the video recorder into record mode.

The alarm generator 232 also passes a signal to alarm transmitter 221 on line 223 when the comparator 210 determines that the vehicle's speed has exceeded the threshold as shown in FIG. 2. The alarm transmitter 221 may be optionally utilized to transmit an indication that the vehicle has exceeded the threshold speed value. The alarm indication may be used locally or transmitted remotely, for example to a police agency headquarters as indicated by line 266. The alarm transmitter may be implemented using a standalone transmitter such as wireless transmitter that provides a connection to wireless network such as a wireless wide area network. Alternatively, an existing transmitter (such as one incorporated within a vehicle's data communications device or computer) may be utilized. In this case, the alarm signal is passed to the data communications device for transmission to the remote location.

The threshold speed value may be stored within comparator 210, for example using a register, or received from an external threshold storage device. The threshold speed value in this illustrative embodiment of the invention is user-settable. Thus, a threshold selector 212 is operably coupled to comparator 210 via line 211 as shown in FIG. 2. Threshold selector 212 may be utilized to set a storage register in comparator 210 to a user-desired threshold speed value. Alternatively, in some applications of the invention, threshold selector 212 may itself function as a threshold speed value storage element that is external to comparator 210.

Threshold selector 212 is operably coupled to a user interface 215 to allow a user input (indicated by reference numeral 213 in FIG. 2) to set the threshold speed value. User interface 215 may be implemented using a simple conventional mechanical or electronic switch or sensor element having sufficient switch or sensing positions to correspond to the desired number of settable increments over a speed range of interest. For example, it may be desirable to provide a user with a speed range of 30 to 100 miles per hour within to set the threshold speed value in 10 mile per hour increments. In this case, user interface 215 is implemented using a switch or sensor with eight discrete switched states. In other application, an infinitely variable threshold speed value may be appropriate and user interface 215 would be arranged accordingly. Of course, all such user interfaces are commonly implemented in many technology applications and are well understood.

An alternative to a simple user interface using a switch or sensor is depicted in FIG. 2 by reference numeral 218. There, a graphical user interface ("GUI") input/output ("I/O") generator 218 is coupled to the threshold selector 212 via line 217. As shown in FIG. 2, The GUI I/O generator 218 sends and receives signals to a remote display device such as a monitor (not shown) over line 265. Such display device may include the video monitor that is typically provided with many in-car video systems. However, in some applications of the invention, it may be desirable to incorporate a display device directly within the activation controller 180. In either case, a display device using I/O data from GUI I/O generator 218 may facilitate the user-settable threshold speed value feature contemplated by the invention. For example, a menu of threshold speed values may be generated by GUI I/O generator 218 and displayed on the display. A user would select the desired value from the menu using typical GUI techniques using a conventional pointing or other selection device to indicate a user selection.

In some applications of the invention, it may be advantageous to provide a user interface to the activation controller 180 by implementing a user interface using existing computer equipment that may be in the vehicle in which the inventive in-car video system is installed. For example, many police agencies use in-car computer systems (e.g., ruggedized laptops) for data communications and logging functions. In such a case, a network connection between the GUI I/O generator 218 and in-car computer can be used to provide necessary connectivity and the operating status of the activation controller or in-car video system may be ported to the computer. In most cases, a client application must be installed on the in-car computer system to provide the desired user interface function to the activation controller 180. The existing keyboard and other user interface such as pointing devices and touch screens implemented on the in-car computer may be utilized to provide user input to the activation controller 180.

The user interface may be optionally configured to provide restricted access (for example using login and passwords) so that only designated personnel within an agency may set or adjust the threshold speed value. For example, it may be desirable that only command staff personnel be provided with the logins and passwords to change the threshold speed value (that when exceeded results in the activation of the video recorder into record mode and/or send a vehicle over-speed signal to headquarters, as described above). The user interface 215 may also be simplified or eliminated in some applications of the invention to save costs or in instances when threshold speed adjustability is not an important feature. In this case, a fixed threshold speed value is stored in activation controller 180. The fixed threshold speed value would typically be set at an arbitrarily high value, for example 80 miles per hour or higher, so that automatic activation of the video recorder by vehicle over-speed only occurs under non-routine or emergency driving circumstances.

On line 208 in FIG. 2, audio and video information captured by the in-car video system's cameras is received by video input 282. Video input 282 typically provides a signal conditioning and buffering function to the video signal prior to being provided on line 286 to a video generator 239. As shown in FIG. 2, video generator 239 is coupled to receive vehicle speed data from the comparator 210, but in some applications may receive a VSS signal directly from the VSS input signal conditioner 203 (or even the VSS sensor itself).

In analog video recording system applications, video generator 239 provides a video overlay to the received video signal so that the vehicle speed is superimposed over video image of the scene capture by the car-mounted camera. In digital recording system applications, the video generator 239 is replaced by a data generator (not shown) that provides vehicle speed data as part of the metadata stream that is typically digitally encoded and recorded along with the video and audio information associated with a recorded incident. Video generator 239 provides a combined video output stream to video output 245 which appropriately conditions the signal for output to a video recorder on line 269. The video signal output on line 269 may also be directed to a video monitor mounted in the vehicle.

Figure 3:
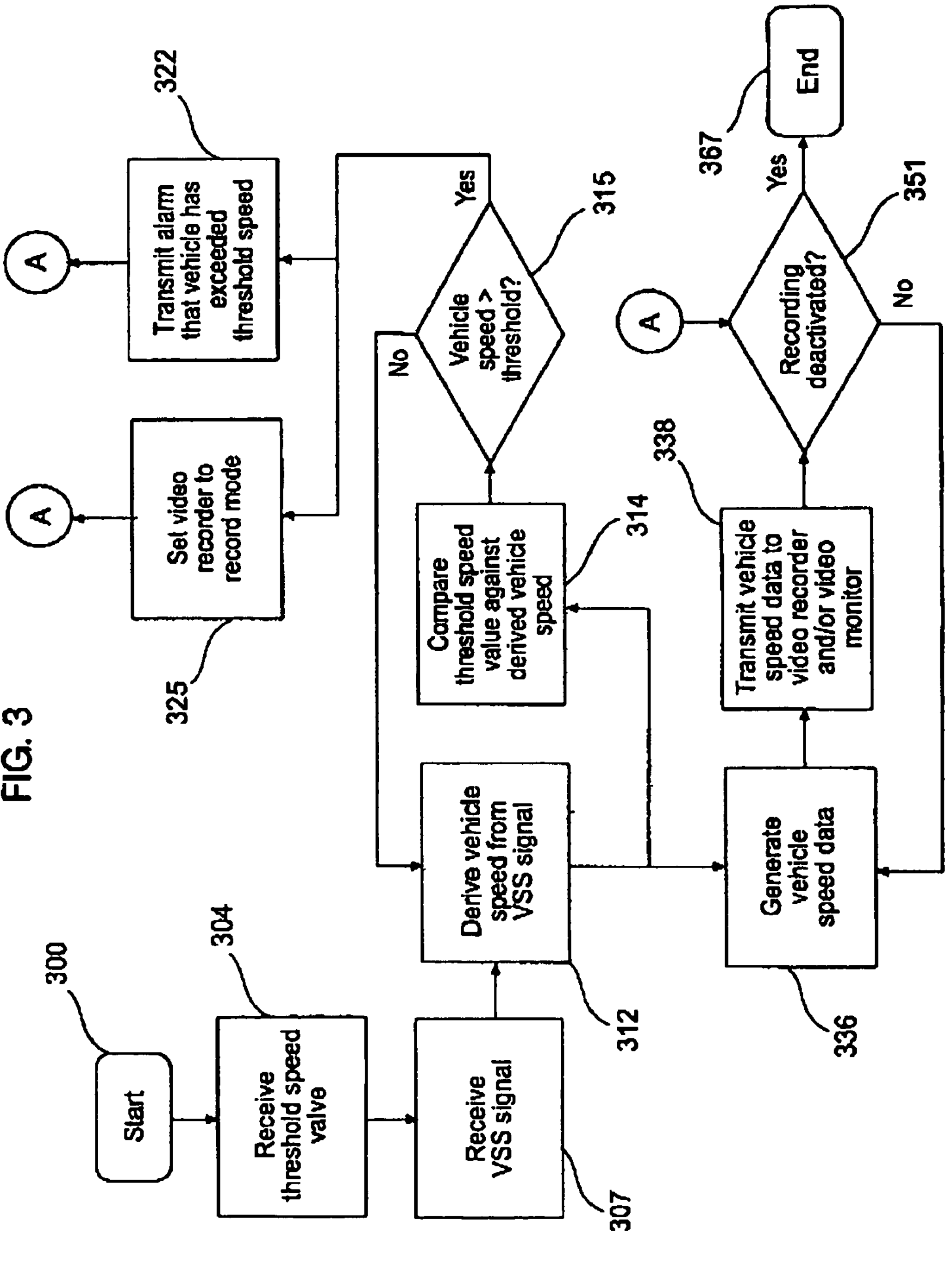
FIG. 3 is a simplified flow chart depicting an illustrative method in accordance with the invention.

Turning now to FIG. 3, there is depicted a simplified flow chart of an inventive method of operating an in-car video system. The method starts at block 300. At block 304, a threshold speed value is received. In most applications of the invention, this threshold speed value is user-settable in a similar manner as shown in FIG. 1 and described in the accompanying text. However, as discussed above, a fixed threshold speed value may be advantageously utilized in order to simplify or reduce the cost of the implementation of the automatic recording feature, as contemplated by the present invention, by eliminating the threshold speed value setting user interface.

At block 307, the method continues with a VSS signal being received from a vehicle speed sensor that is mounted in a vehicle in which an in-car video system incorporating the inventive method is installed from which a vehicle speed is derived as shown in block 312. In most applications of the invention, the VSS signal (being a dynamic signal that typically varies with time as the speed of the vehicle changes) is continuously received and evaluated in the inventive method described herein.

At block 314, the threshold speed value received at block 304 is compared against the vehicle speed derived in block 312 from the received VSS signal. As indicated in decision block 315, a determination is made as to whether the vehicle speed is greater than the threshold speed value. If the vehicle speed is less than the threshold speed value, then control is passed back to block 312 and an additional vehicle speed determination is made from the received VSS signal. As the speed of the vehicle may have changed since previous comparison, another comparison is made of the vehicle speed against the threshold speed value in block 314. The process of deriving in block 312 and comparing in block 314 is performed iteratively and continuously over time. The rate of iteration may be adjusted to suit the particular application, but in most implementations using conventional microcontrollers and signal processing, the nominal clock rate is in the range of megahertz which allows each iteration shown in FIG. 3 to occur within milliseconds or faster.

If, at decision block 315, the vehicle speed exceeds the threshold speed value, then control passes to block 325 and a video recorder (e.g., 120 in FIG. 1) used with the in-car video system is activated. The video recorder records video and audio captured, respectively, by the in-car video camera (e.g., 150 in FIG. 1) and microphones. The recording continues until such time that the system is deactivated as indicated by decision block 351 in FIG. 3.

Optionally, as shown at block 322, an alarm may be transmitted to indicate that the vehicle has exceeded the threshold speed. Such alarm may be transmitted to a remote location such as a police agency headquarters. In addition, the alarm may be used locally by the in-car video system or other data collection and analyzing equipment that may be installed within the vehicle such as computers and data loggers.

As shown at block 336 in FIG. 3, vehicle speed data is generated from the derived vehicle speed received from block 312. The vehicle speed data is transmitted to a video monitor and/or video recorder at block 338. As described above, in analog video recorder applications, the vehicle speed data is provided as an overlay over the analog video signal captured by the camera. In digital video recorder applications, the vehicle speed data is provided as digitally encoded metadata. Control passes to decision block 351. If the recording has not been deactivated, the steps of speed data generation and transmission in blocks 336 and 338 repeat in an iterative manner until the video recorder is deactivated (for example, after an encounter or incident has reached an end point and no more video evidence is required to be recorded).

Other features of the invention are contained in the claims that follow.

What is claimed is:

1. An activation controller for automatically activating an in-car video system that includes a car-mounted camera and video recorder, comprising:

an input for receiving a vehicle speed sensor signal that is indicative of a speed of a vehicle in which the in-car video system is installed;

a comparator for comparing the speed of the vehicle against an activation threshold;

an alarm generator coupled to the comparator for generating an alarm signal if the speed of the vehicle exceeds the threshold; and an output for transmitting the alarm signal to a trigger input of the in-car video system so that the video recorder is activated into the record mode of operation upon receiving the alarm signal.

2. The activation controller of claim 1 further including a selector for selectively adjusting the activation threshold.

3. The activation controller of claim 2 further including a graphical user interface that is displayable on a display device for providing user-selectable control over the activation controller.

4. The activation controller of claim 3 where the user-selectable control includes control over the selector to set the activation threshold to a setting desired by the user.

5. The activation controller of claim 1 further including a character generator for creating a video overlay that includes a graphical representation of the speed of the vehicle.

6. The activation controller of claim 5 where the activation controller is arranged so that video overlay is displayable on a video monitor and superimposed on a video image captured by the car-mounted camera.

7. The activation controller of claim 6 where the activation controller is arranged so that the captured video and superimposed video overlay of the speed of the vehicle is recordable by the video recorder.

8. The activation controller of claim 1 further including a transmitter coupled to receive the alarm signal for transmitting an indication to a remote location that the speed of the vehicle has exceeded the activation threshold.

9. The activation controller of claim 8 where the transmitter comprises a wireless transmitter.

10. A method of operating an in-car video system including a car-mounted camera and video recorder that is installed and operated in a vehicle, the method comprising the steps of:

receiving a vehicle speed sensor signal that is indicative of a speed of the vehicle; and activating the in-car video system into a record mode of operation if the speed of the vehicle exceeds a threshold speed so that a video image captured by the car-mounted camera is recorded by the video recorder.

11. The method of claim 10 further including a step of transmitting an alarm signal to a remote location to indicate that the vehicle has exceeded the threshold speed.

12. The method of claim 10 further including a step of providing a user with an interface to adjust the threshold speed.

13. The method of claim 12 where the interface comprises a graphical user interface displayed on a display device.

14. The method of claim 10 further including a step of generating a video overlay that includes a representation of the speed of the vehicle.

15. The method of claim 14 where the video overlay is combined with a video image captured by the car-mounted camera and provided to the video recorder as a recordable video stream.

16. An in-car video system, comprising:

a video recorder mountable in a vehicle and arranged to be coupled to a camera mounted in a vehicle so as to receive video captured by the camera; and a controller that is arranged to be coupled to receive a signal from a vehicle speed sensor mounted in the vehicle, the signal being indicative of speed of the vehicle, for triggering the video recorder into record mode when the speed of the vehicle exceeds a threshold speed.

17. The in-car video system of claim 16 further including a metadata generator for generating metadata that is recordable by the video recorder.

18. The in-car video system of claim 17 where the metadata includes vehicle speed data derived from the signal from the vehicle speed sensor.

19. The in-car video system of claim 16 further including a user interface coupled to the controller for providing user-selection over the speed threshold.

20. The in-car video system of claim 19 where the user interface includes an on-screen menu that provides the user with a selection of speed thresholds in incremental units of speed.

* * * * *

UNITED STATES PATENT AND TRADEMARK OFFICE
CERTIFICATE OF CORRECTION

PATENT NO. : 7,023,333 B2
APPLICATION NO. : 10/691484
DATED : April 4, 2006
INVENTOR(S) : Blanco et al.

It is certified that error appears in the above-identified patent and that said Letters Patent is hereby corrected as shown below:

Cover Sheet, change Assignee (73) to -- L-3 Communications Mobile-Vision, Inc. Boonton, NJ (US) --.

Specification, Col. 2, line 65, after “a” change “windshield mounted” to -- windshield-mounted --.

Specification, Col. 3, line 11, before “camera” change “windshield mounted” to -- windshield- mounted --.

Specification, Col. 3, line 21, before “secure” insert -- a --.

Specification, Col. 5, line 28, after “as” insert -- a --.

Specification, Col. 5, line 29, after “to” insert -- a --.

Specification, Col. 5, line 55, before first word “to”, insert -- which --.

Specification, Col. 5, line 58, change first word “other” to -- another --.

Specification, Col. 6, line 41, change first word “send” to -- sends --.

Specification, Col. 6, line 63, after “over” insert -- a --.

Specification, Col. 6, line 64, after “scene” change “capture” to -- captured --.

Signed and Sealed this

Fifth Day of December, 2006

JON W. DUDAS
*Director of the United States Patent and Trademark Office*